(12) United States Patent
Miners et al.

(10) Patent No.: US 12,545,213 B2
(45) Date of Patent: Feb. 10, 2026

(54) DEVICE FOR VEHICLE MONITORING AND SYSTEM INCLUDING SAME

(71) Applicant: APPY RISK TECHNOLOGIES LIMITED, Cheshire (GB)

(72) Inventors: William Ben Miners, Guelph (CA); Peter Finch, Cheshire (GB); Jason Rae Middleton, Lancashire (GB)

(73) Assignee: APPY RISK TECHNOLOGIES LIMITED, Cheshire (GB)

( * ) Notice: Subject to any disclaimer, the term of this patent is extended or adjusted under 35 U.S.C. 154(b) by 110 days.

(21) Appl. No.: 17/928,404

(22) PCT Filed: May 28, 2021

(86) PCT No.: PCT/GB2021/051315
§ 371 (c)(1),
(2) Date: Nov. 29, 2022

(87) PCT Pub. No.: WO2021/240172
PCT Pub. Date: Dec. 2, 2021

(65) Prior Publication Data
US 2023/0202431 A1 Jun. 29, 2023

(30) Foreign Application Priority Data
May 29, 2020 (GB) ...................... 2008104

(51) Int. Cl.
*B60R 25/30* (2013.01)
*G07C 5/00* (2006.01)
*G07C 5/08* (2006.01)

(52) U.S. Cl.
CPC ............ *B60R 25/302* (2013.01); *G07C 5/008* (2013.01); *G07C 5/085* (2013.01)

(58) Field of Classification Search
CPC ....... B60R 25/302; B60R 25/31; G07C 5/008; G07C 5/085
See application file for complete search history.

(56) References Cited

U.S. PATENT DOCUMENTS

2002/0032041 A1* 3/2002 Hirai ....................... H04M 1/04
455/557
2009/0117946 A1* 5/2009 Tomasini ................ H04M 1/04
455/575.1

(Continued)

FOREIGN PATENT DOCUMENTS

GB 2498793 7/2013
GB 2522728 8/2015

(Continued)

OTHER PUBLICATIONS

Search Report for GB Patent Application No. 2008104.8, dated Nov. 2, 2020.

(Continued)

*Primary Examiner* — Omer S Khan
(74) *Attorney, Agent, or Firm* — GREENBLUM & BERNSTEIN, P.L.C.

(57) ABSTRACT

An information capture device for vehicle monitoring, the device including an external housing configured so that it can be wedged into a gap between two surfaces, at least one power supply, at least one communication device and at least one sensor to capture input information in relation to at least one measurable parameter relating to the vehicle is provided. A system including the information capture device and a portable computing device such as a smartphone, tablet or the like and/or a remote server for analysis of the captured information is also disclosed.

25 Claims, 4 Drawing Sheets

(56) References Cited

U.S. PATENT DOCUMENTS

| | | | |
|---|---|---|---|
| 2010/0157061 A1* | 6/2010 | Katsman | G07C 5/008 348/149 |
| 2011/0112717 A1 | 5/2011 | Resner | |
| 2013/0302758 A1 | 11/2013 | Wright | |
| 2014/0277911 A1 | 9/2014 | Chinnadurai | |

FOREIGN PATENT DOCUMENTS

| | | |
|---|---|---|
| JP | 2008-244674 | 10/2008 |
| WO | 2019/215635 | 11/2019 |

OTHER PUBLICATIONS

Internation Search Report issued in International Patent Application No. PCT/GB2021/051315, dated Sep. 2, 2021.
Written Opinion of the ISA issued in International Patent Application No. PCT/GB2021/051315, dated Sep. 2, 2021.

* cited by examiner

DEVICE FOR VEHICLE MONITORING AND SYSTEM INCLUDING SAME

TECHNICAL FIELD OF THE INVENTION

The present invention relates generally to the monitoring of a vehicle. In particular, but not exclusively, the invention concerns a device for monitoring or assessing ambient conditions and/or dynamic vehicle behaviour.

BACKGROUND TO THE INVENTION

Assessing dynamic vehicle behaviour is important for environmental, societal, and individual health and safety. Observing vehicle dynamics enables potential vehicle health issues to be identified early through changes in vehicle performance and vibrations. Solving vehicle health issues early improves both vehicle efficiency and environmental impact. The same vehicle dynamics are also valuable to identify risky driving behaviours and coach drivers with targeted, actionable feedback to modify future driver behaviour, reducing the probability for the driver to cause a future crash impacting the health and safety of both the driver and other travellers sharing our transportation networks.

Technologies to measure vehicle dynamics include accelerometers and gyroscopes embedded within a telematics control unit within the vehicle, either built into the vehicle or connected to the vehicle as an aftermarket device. While telematics control units are important and provide rich information to measure vehicle dynamics, they are not always practical in scenarios where the cost of installation and/or the cost of the additional hardware components is not commercially justifiable, or where installation flexibility is required.

Sensors within mobile telephones are often used to help minimize or eliminate additional in-vehicle hardware costs. Mobile telephone sensors can provide rich information about the mobility of individuals, and provide good proxies for high level vehicle movements including travel routes, vehicle speed, and manoeuvres. Unfortunately, mobile telephone sensors have significant limitations, including:

1. A complete record of vehicle movements cannot be guaranteed with a mobile telephone on its own since there is no mechanism to measure the vehicle when the telephone is not present or powered down.
2. The relationship between the telephone and the vehicle is loose, requiring non-deterministic techniques to be used to assign mobile telephone measurements to a potential vehicle. This uncertainty can cause observations from the mobile telephone to be assigned incorrectly in some cases.
3. Initial trip detection timing is slower using a mobile telephone than with in-vehicle hardware. Since the mobile telephone is battery-powered, techniques are required to adaptively manage power on the telephone, resulting in an inherent delay in detecting the start of each trip.
4. The mobile telephone is in an uncontrolled location within the vehicle, which may include a purse, the glove-box, resting loosely on the seat, in the centre console, mounted to the vehicle, in a door pocket or simply in the occupant's pocket. These uncontrolled locations introduce uncertainty and poor signal-to-noise ratios when considering the mobile telephone sensors as proxies for high precision vehicle dynamics.

Aftermarket, battery-operated or self-powered devices are available to help solve some of the limitations using the mobile telephone. These devices are designed to be affixed to the vehicle by the end-user, and typically include a short-range wireless mechanism between the device and a mobile telephone. These self-powered devices with some form of short-range wireless communication are sometimes called 'tags', 'beacons', or IoT/network-enabled vehicle devices. In their simplest form, these devices help improve the accuracy of the non-deterministic methods to associate mobile telephone data with a known vehicle by broadcasting a unique identifier for the mobile telephone to observe and include as part of the trip information captured by the telephone. In more sophisticated devices, an accelerometer is included to help provide more consistent vehicle-centric accelerometer measurements to augment mobile telephone measurements.

Unfortunately, while device sensors can be high quality, the installation location by the end-user is still uncontrolled and often results in the tag or device being thrown into the most convenient location, usually the centre console or glove-box. This occurs even when instructions are provided to affix the device to the windscreen or another rigid surface within the vehicle. Without a good coupling between the vehicle and sensor, the sensor cannot reliably measure high precision vehicle movements.

Embodiments of the invention seek to at least partially overcome or ameliorate any one or more of the abovementioned disadvantages or provide the consumer with a useful or commercial choice.

SUMMARY OF THE INVENTION

According to a first aspect of the invention there is provided an information capture device for vehicle monitoring, the device comprising
- an external housing configured so that it can be positively located into a gap between two surfaces;
- at least one power supply;
- at least one communication device; and
- at least one sensor to capture input information in relation to at least one measurable parameter relating to the vehicle.

Providing an external housing having an external housing configured so that it can be positively located into a gap between two surfaces, for example to match an interior contour formed between the underside of a lower part of a vehicle windscreen and an upper side of the (front or rear) dashboard in a vehicle, provides end-users with physical and visual cues to place the device within the vehicle below the windscreen of the vehicle in a defined position, providing tactile feedback of this location which in turn provides a solid mechanical coupling between the vehicle and device allowing reliable measurement of high precision vehicle parameters. It also makes the location of the device even easier for the end-user than trying to find space in the glove-box or centre console. Placement is important, since the placement of a sensor in an unknown location on the windscreen can result in an unpredictable reduction in observation quality compared to a known, rigid location. This quality reduction occurs due to additional vibrations, dampening or other modifications to vehicle movements before they are measured at an unknown distance along the windscreen.

The vehicle in which the device will normally be used is preferably a land vehicle. Typically, the land vehicle will be a road vehicle such as an automobile or car, bus, truck or the like.

In the context of the present description, the phrase 'vehicle monitoring' may include monitoring of the vehicle itself and/or monitoring of events which occur in the vehicle and/or monitoring of (external) events which occur involve the vehicle.

At least one sensor may be provided to capture input information in relation to at least one measurable parameter relating to vehicle dynamics.

At least one sensor may be provided to capture input information in relation to at least one measurable parameter relating to conditions within the vehicle or outside the vehicle.

At least one sensor may be provided to capture input information in relation to at least one measurable parameter relating to events occurring within the vehicle or outside the vehicle.

At least one sensor may be provided to capture input information in relation to at least one measurable parameter relating to occupant entry to and/or exit from the vehicle.

In the present description, directions such as front, rear, sides, up and down are in respect of the use position of the device and are determined with reference to the vehicle within which the device is used.

The external housing of the device is preferably configured so that it can be positively located into a gap between two surfaces. This will preferably allow the securing of the device in a known location and/or allow the securing of the device in a known orientation. The gap may be located between any two surfaces. The positive location may be achieved in a number of ways including the provision of the device in a shaped external housing, provision of a housing that is sized to be inserted into the gap in a friction fit or requiring some deformation of the housing or the surfaces defining the gap, or providing a fixing mechanism or assembly for example. The positive location may result in abutment of at least one side wall of the housing with at least one of the surfaces defining the gap. Alternatively, the at least one side wall of the housing may be spaced from at least one of the surfaces defining the gap.

The external housing of the device may be configured so that it can be wedged into a gap between two surfaces.

The external housing of the device may have a wedge configuration. The external housing of the device may have a wedge configuration in use. The housing may have at least one movable portion. The at least one movable portion may be movable between any two or more positions allowing the external housing to be wedged into a gap between two surfaces. In use, the at least one movable portion may be movable into a position so that the external housing assumes a wedge configuration.

The external housing of the device may have a wedge shape or a wedge-shaped portion.

The device preferably includes an external housing with at least one sidewall defining a wedge-shaped portion. The external housing will typically contain the components of the device. In some configurations, a sensor or portion thereof may extend from the housing.

The housing will preferably comprise at least one opening in at least one sidewall thereof.

The housing is preferably generally wedge-shaped in overall shape. The preferred wedge-shaped housing preferably includes at least one wall that tapers toward a base wall at a forward end. The thickness of the device is preferably less at the forward end of the device and greater at the rearward end. The angle of the wedge-shaped housing is preferably similar to the angle of the windscreen of a vehicle relative to an upper surface of the dash.

The windscreen angle is typically the angle measured between the vertical and an 18" chord struck between the bottom of the screen (technically it is the cowl point or the deck point, a line tangent to the top of the hood/bonnet or decklid/seal) and a point on the upper edge of the windscreen on a vehicle centreline. The actual angle depends on the vehicle and have generally been between about 40 and 55 degrees for a car or similar vehicle. Clearly a vehicle such as a bus or a truck will have a windscreen angle which is different to a car or similar vehicle and much more vertical with an angle typically between 70 degrees and 90 degrees.

The housing (or any part of the housing) may be manufactured from any one or more materials suitable for the application. One or more plastic materials will normally be used. The material(s) used will preferably be UV resistant given that the device will typically be located in an exposed position on the vehicle dashboard.

The housing will normally be a multipart housing. Normally, at least two housing portions will be provided. Typically, a lower housing portion is provided and an upper housing portion or cover is also provided. The housing portions will preferably be releasably attachable to or relative to one another to close the housing.

The lower housing portion will normally include a base wall. The base wall may be planar. The base wall may have a shaped or contoured lower surface to correspond to an upper surface of the dashboard. This may assist with the location of the device in the vehicle.

At least one sidewall will preferably be provided extending at an angle from the base wall. Generally, a rectangular shaped housing is preferred and therefore, normally at least three and preferably four sidewalls are provided extending upwardly from the base wall.

Preferably each at least one sidewall will extend from the base wall substantially perpendicularly. Each at least one sidewall will preferably extend from the base wall at a peripheral location of the base wall.

Typically, a forward side wall is provided and will normally be shorter or lower than a rear sidewall. The lateral sidewalls will typically have an angled upper edge extending between an upper edge of the forward side wall and an upper edge of the rear side wall. The lower housing portion may lack a forward side wall.

The lower housing portion may comprise a substantially planar base wall and only minimally extending upstanding side walls. In this configuration, at least one depending side wall maybe provided on the upper housing portion.

The upper housing portion will preferably include a top wall. One or more sidewalls may depend from the top wall.

The top wall may have an arcuate rear portion. The top wall may have a planar, angled forward portion.

Shaped lateral side walls are preferably provided to close the lateral sides of the upper housing portion.

In an embodiment, an adhesive such as double-sided tape or similar can be provided on an upper side of the angled forward portion to assist with attachment of the device to the windscreen.

In an embodiment, an adhesive such as double-sided tape or similar can be provided on a lower side of the base wall to assist with attachment of the device to the dashboard.

One or more recesses/depressions may be provided in an upper side of the angled forward portion. In an embodiment, an adhesive such as double-sided tape or similar can be located in a recess on an upper side of the angled forward portion to assist with attachment of the device to the windscreen.

Preferably, when the upper housing portion is attached to the lower housing portion, a wedge-shaped housing is formed.

The upper housing portion or cover will normally be releasably attachable relative to the lower housing portion. Removal of the upper housing portion from the lower housing portion will typically allow access to the internal components of the housing. In an embodiment, the upper housing will preferably attach to the lower housing portion using a releasable attachment. Any type of attachment may be used. A snap fit assembly may be used.

One or more openings may be provided in at least one, and preferably both of the shaped lateral side walls of the upper housing portion. Typically, a single elongate opening will be provided in each lateral side wall.

At least one resiliently deformable arm may be provided relative to at one and preferably both of the lateral sidewalls of the lower housing portion. Typically, a single resiliently deformable arm will be provided relative to each lateral side wall. Each resiliently deformable arm is preferably associated with an angled surface at an upper end thereof which, in use, will abut the lower edge of the shaped lateral side walls of the upper housing portion as the upper housing portion is forced downwardly to attach the upper housing portion to the lower housing portion. The angled surface will typically force temporary deformation of the respective resiliently deformable arm.

An abutment shoulder or surface is provided on each at least one resiliently deformable arm. The at least one resiliently deformable arm will preferably be deformed until the abutment shoulder or surface is aligned with an edge of a respective opening in the shaped lateral side walls of the upper housing portion, engaging the edge to lock the upper housing portion relative to the lower housing portion.

A user may force the deformation of the resiliently deformable arm in order to clear the abutment shoulder or surface from edge of the opening in the shaped lateral side walls of the upper housing portion, allowing separation of the upper housing portion from the lower housing portion.

The upper housing portion and/or lower housing portion may be provided with one or more optically transparent portions. At least one optically transparent portion is preferably provided at or towards a forward side of the upper housing portion. A part of the preferred angled planar top wall is preferably optically transparent. The provision od such an optically transparent portion will typically allow the use of an optical sensor in the device to capture information on at least light conditions. For example, a forwardly oriented light sensor may be provided to detect approaching headlights of oncoming traffic. An optical sensor could also be used to detect ambient light levels outside the vehicle which can be analysed for a variety of conditions/situations such as when the vehicle enters a tunnel or a carpark for example (a rapid reduction in light) as opposed to night falling (a more gradual reduction of light).

The underside of the base wall of the device may be provided with a location assistance or guidance structure or configuration. A recess may be provided on the underside of the base wall. Double sided adhesive tape may be located in the recess and used to attach the device relative to the vehicle, guided by the wedge shape.

Alternatively, one or more clips, clasps, catches may be provided. A mount may be provided on the dash relative to which the device mounts.

One or more apertures or openings may be provided in one or more of the housing portions, through the at least one sidewall. One or more apertures may be located in a recess in the housing.

One or more aperture or opening may be provided in the base wall of the housing. Any such aperture or opening will typically allow more directed capture of vehicle specific information (such as changes in the operation of the vehicle, for example, engine vibration, suspension vibration of the like) through juxtaposition of the one or more aperture or opening with the dashboard. Any such aperture or opening will take advantage of the phenomenon that sound or vibration typically travels better and/or faster and/or more completely through a solid medium such as through the dashboard and therefore may be transmitted more efficiently for capture at the underside of the device.

One or more aperture or opening may be provided in an upper wall and/or any one or more of the side walls of the housing. Any such aperture or opening will typically allow more directed capture information relating to changes or situations occurring within the vehicle (as opposed to changes in the operation of the vehicle). For example, any such aperture or opening is more likely to allow the capture of better-quality information relating to occupant noise and may be capable of capturing directionality information as well that could allow the number of occupants to be more accurately determined as well as seating location within the vehicle.

Any aperture or opening in the housing of the device will typically also allow ventilation of internal components of the device.

The device of the present invention may be provided with at least one internal power supply. The provision of at least one internal power supply will allow the device to be independent of the vehicle power supply. Normally a single power supply is provided although in some conditions a primary power supply and a backup or secondary power supply may be provided. The power supply will typically be or include one or more batteries. Any battery maybe rechargeable in situ. Any battery may be removable and/or replaceable. Where the power source is provided as a battery, the battery is typically provided at an upper part of the lower housing so as to be accessible when the preferred upper housing portion is removed from the lower housing portion.

The device of the present invention preferably includes at least one communication device. The device of the present invention may be a part of a system in which the device captures information and transmits the captured information to a remote location (in the same vehicle or to outside the vehicle). Preferably the at least one communication device is or includes a short-range wireless transceiver. A short-wave wireless transceiver can transmit to a personal computing device such as a smartphone or tablet or similar, including a telematics module or infotainment system embedded into the vehicle. A smartphone or tablet or similar may process the information thereon and/or may transmit information (raw and/or processed information) to a further remote location or server for example.

Any communication standard may be used including any one or more of Bluetooth®, WiFi®, NFC, radio, optical or similar. More than one communication device may be provided to allow different (and separate) communication pathways to be used for the same device. There may be advantages to providing multiple, independent communication pathways such as separation of captured information from updates or instructions to the device.

The device of the present invention preferably includes at least one sensor to capture input information in relation to at least one measurable parameter relating to the vehicle. Typically, the device will include a number of sensors, preferably configured to capture different types of information. The information will typically be captured contemporaneously. The advantage of capture of different types of information contemporaneously is that analysis of different types of information captured contemporaneously may reveal more than analysis of a single type of information.

The device may include one or more accelerometer preferably used to detect the orientation of the device. An accelerometer typically measures linear acceleration of movement.

The device may include one or more gyroscope. A gyroscope preferably adds an additional dimension to information supplied by the preferred accelerometer, by tracking rotation or twist. A gyroscope typically measures angular rotational velocity.

An accelerometer will typically measure the directional movement of a device but will normally not be able to resolve its lateral orientation or tilt during that movement accurately unless a gyroscope is there to fill in that information.

A multi-axis accelerometer may be combined with a multi-axis gyroscope to provide information in relation to the orientation of the device that is both clean and responsive in the same time.

The device may include one or more magnetometer, typically used to detect the Earth's magnetic field along three perpendicular axes X, Y and Z. As such, a magnetometer can detect rotational information in relation to the device. In addition to general rotational information, the magnetometer can detect the relative orientation of the device relative to the Earth's magnetic north. A magnetometer is preferably used to provide digital compass functionality to determined orientation of the device in relation to the Earth's magnetic field.

The device may include one or more optical sensor to measure quantity of light. One or more optical sensor can be used to capture information as to the quantity of light incident on the device. More than one optical sensor may be provided oriented in different directions. This may allow directionality of the light measurement to be determined.

The device may include one or more water sensor to detect moisture, most commonly mist, fog or rain. Any type of sensor may be used for this purpose. The one or more water sensor will preferably capture information about mist, fog or rain with reference to the windscreen of the vehicle in which the device is located. A sensor that projects infrared light into the windscreen may be used. The device may include a rain sensor such as an infrared sensor positioned relative to the housing so that the rain sensor may contact the windscreen when the device is positioned correctly in the vehicle.

The device may include one or more pressure sensor to capture information regarding pressure inside the vehicle. The one or more pressure sensor may typically capture variations/changes in pressure within the vehicle, particularly those which may indicate a particular event has taken place such as opening and closing a door of the vehicle for example. One or more pressure sensors may be provided to capture information relating to external pressure.

The device may include one or more sound sensor/ microphone to capture information relating to the level of sound within the vehicle and/or relating to the vehicle.

A microphone or sound capture device mounted within the vehicle preferably enables the device to characterize the level of potential internal acoustic distractions for the driver, including loud music or occupant noises. The one or more sound sensor/microphone will normally be mounted within the housing. Preferably, the one or more sound sensor/ microphone will be mounted within the housing relative to one or more openings in a wall of the housing.

A microphone preferably covers a complementary spectrum extending into higher frequencies than the accelerometer to improve the detection and classification accuracy of vehicle collisions. The device/system may use frequency domain analysis and pattern recognition algorithms to identify previously trained patterns of vehicle impacts via sound captured by the microphone.

One or more broad spectrum microphone may be used. This may allow the microphone to capture sounds but also other vibrations which are outside audible range.

In the case of a vehicle collision, the device preferably stores a higher frequency set of information from all sensors before, during, and after the collision. This is typically achieved using circular buffers with configurable durations and frequencies.

The method that can be used to detect vehicle collisions can also be applied to vehicle damage detection or potential theft even if the vehicle is stationary, including glass break detection.

The sound capture sensor or microphone may be used to ascertain driver/occupant entry. This in turn can be used to measure for example, the time between driver entry and vehicle ignition start or vehicle motion, as a proxy for the state of mind of the driver (on the basis that a driver than enters and then starts the vehicle may be more aware or more focussed than a driver that waits a significant period after entry to start the vehicle).

Use of door open/close detection can also be used to estimate vehicle occupancy for other reasons such as (but not limited to) risk assessment and occupancy information for HOV/HOT lane qualification.

The device may include one or more vibration sensor to capture information relating to vibrations of the device. More than one vibration sensor may be provided. A vibration sensor may be provided to capture vibration information relating to vehicle operation and/or performance. A vibration sensor may be provided to capture vibration information relating to in-cabin vibrations (typically those caused by occupants as opposed to those caused by, emanating from or through (such as vibration caused by road conditions) the vehicle itself).

The device may include one or more proximity sensor to detect when an object such as a mobile telephone or tablet for example, is proximate to the device. This functionality may be used to initialise the capture of information by the device. This functionality may be used to prepare components of a mobile telephone or tablet for example. The device can utilise proximity information to use adaptive power management techniques to deliver years of operation without user intervention. The start of each trip may be automatically detected in a timely manner by detecting the vehicle door opening and closing as an initial pre-trip cue, that is, the device can exit sleep mode upon detecting the vehicle door opening and closing. This approach can ensure any mobile telephone that might be present as a part of a system, can enable its GNSS subsystems and/or other sensors, so they are ready by the time the vehicle ignition is turned on, delivering more complete trip information than would be possible using information which is conventionally gathered using a mobile telephone only. This approach can provide valuable pre-trip information about the time between the driver entering the vehicle and the time the vehicle ignition is enabled, that is not available from any known aftermarket or professionally-fitted telematics hardware.

Use of information captured from more than one sensor (particularly contemporaneous information from different sensors) can lead to a reduction in false-positive situations such as using contemporaneously captured accelerometer and acoustic information to cross-check for anomalies. Another situation when information from the accelerometer and acoustic information may be used is in the classification of collisions and glass break for example.

The device may include one or more real-time clock. The device may utilise an external device such as a smartphone or tablet for example to forward information captured to a remote location. The device may operate in a store and forward mode until the device detects the presence of an appropriate external device. When the external device is not present, the device preferably continues to capture all vehicle activity in a store-and-forward manner.

The device may include one or more information storage devices onboard the device to store information until the information can be forwarded. The information storage will preferably be electronic information storage. The electronic information storage will preferably be non-volatile storage.

The information captured will preferably be timestamped on the device. One challenge with offline store-and-forward systems is the time accuracy of the internal real-time-clock. Rather than just capturing vehicle activity with timestamps, the device will preferably calculate a measure of time accuracy of the real-time clock with each trip and/or event which is stored. The measure of time precision of the real-time clock is preferably encoded with the information captured. By encoding this additional information, the information will typically become more valuable in auditing, forensic, insurance claims, or other high-integrity use cases.

The accuracy/precision of real-time clocks, such as the one preferably included in the device, is normally accounted for using periodic synchronisation with an official time reference. In this way, any difference in the time of the real-time clock and the time at the official time reference can be measured and accounted for. The accuracy/precision of the real-time clock may be affected by both the recency of clock synchronization at the time of information capture, the internal clock drift characteristics, and in some cases, external factors including temperature for example. ('Accuracy' refers to how close a measurement is to the true or accepted value. 'Precision' refers to how close measurements of the same item are to each other. Precision is independent of accuracy. The real-time clock used in the device will typically be both accurate and precise. The real-time clock is preferably configured to calculate a measure of time accuracy of the real-time clock).

The device will normally have an electronic operating system operating on an onboard processor. The electronic operating system will normally be or include a software application which will preferably control the operating of the components of the device.

The device will preferably further comprise a wireless transceiver. The transceiver will preferably be a short-range transceiver which can be associated (wirelessly) with a long-range transceiver to provide the preferred store and forward functionality with the short-range transceiver is associated with the device.

In another form, the present invention may comprise a system for high precision ambient and dynamic vehicle assessment, the system including an in-vehicle information capture device having any one or more of the features describe hereinbefore and a portable computing device including at least one communication device to receive captured information from the in-vehicle information capture device and at least one information storage device.

Provision of a system including a device and a portable computing device will preferably allow the device to operate in-vehicle when needed (such as for example when the portable computing device is not in range of the device or has little or no outgoing service) in a store and forward mode and also in a continuous mode when possible (such as for example when the portable computing device is in range of the device and has sufficient outgoing service). The device may provide captured information to a remote location through the portable computing device, preferably using the communication components of the portable computing device, which allows the device to be simplified as much as possible as it does not require complex and/or powerful onboard communications components.

The portable computing device may be a smartphone or tablet or other portable computing device with sufficiently powerful communications components to undertake long range communications. The portable computing device will normally include a short-range wireless transceiver (this may be the same transceiver as the long-range transceiver or a separate unit).

Typically, the portable computing device may include at least one on-board accelerometer.

Typically, the portable computing device may include at least one on-board gyroscope.

Typically, the portable computing device may include at least one on-board magnetometer.

Typically, the portable computing device may include at least one on-board navigation component/system. Normally, a smartphone or tablet, for example, will include a Global Navigation Satellite System (GNSS) component.

Typically, the portable computing device may include at least one on-board storage component. Preferably the at least one storage component will be or include electronic storage. The electronic storage will typically be non-volatile storage.

Typically, the portable computing device may include at least one on-board long-range wireless transceiver. The long-range wireless transceiver may be configured to send and receive information to and from an associated short-range transceiver, such as from the device. The long-range wireless transceiver may be configured to send and receive information to and from an associated remote location.

The portable computing device will normally have an electronic operating system operating on an onboard processor. The electronic operating system will normally be or include a software application which will preferably control the operating of the components of the portable computing device. A secondary software application may be provided for operation on the portable computing device to interface with the device. Preferably the secondary software application interfaces with the preferred software application operating on the device. The secondary software application may interface with a server software application operating on a remote server.

The portable computing device may also be realized as a module within the vehicle that handles the long-range communication. This module is may be an embedded telematics or infotainment system.

The system may preferably further comprise a server associated with at least one communication device to receive captured information from the device and a processor operating at least one software program to analyse the information captured by the in-vehicle information capture device.

The server may receive the captured information directly from the in-vehicle information capture device. The server may receive the captured information from the in-vehicle information capture device via the portable computing device.

Typically, only minimal processing will take place on the in-vehicle information capture device. Preferably, only information processing that is required to ensure the encoding of the timestamp information with the captured information (and to maintain information integrity) will occur on the in-vehicle information capture device.

Preferably, the bulk of the processing of the captured information will occur at the server. Analysis of any captured information will preferably occur at the server. Long term storage of captured information (and/or any analysis thereof) will preferably occur in storage associated with the server.

In addition to detection of vehicle collisions and assessing occupant risk to improve safety, the sensor suite can be used to monitor vehicle performance changes over time. The system can be trained to build patterns representing vehicle performance as quantified by vehicle vibrations and noise at given speeds, during specific rates of acceleration, braking, and on known road conditions. As the vehicle continues to be used, deviations from the baseline can be monitored to help detect potential imbalanced wheels, alignment issues, or potential engine issues. These issues can be identified by comparing changes in the mechanical and acoustic information measured from the vehicle when driven in the same speed/acceleration/braking/road conditions.

In another aspect, the present invention may comprise a vehicle with at least one device having the essential features and any one or more of the preferred features described above fitted thereto.

DETAILED DESCRIPTION OF THE INVENTION

In order that the invention may be more clearly understood one or more embodiments thereof will now be described, by way of example only, with reference to the accompanying drawings, of which:

With reference to the accompanying figures, an information capture device 10 for vehicle monitoring is illustrated in FIGS. 1 to 4. The illustrated device 10 comprises a multipart external housing (illustrated assembled in FIGS. 1 and 2 and separated in FIGS. 3 and 4). The illustrated housing includes a lower portion 11 (illustrated in FIG. 3 in particular) and an upper portion 12 (illustrated in FIG. 4 in particular).

Figure 3:
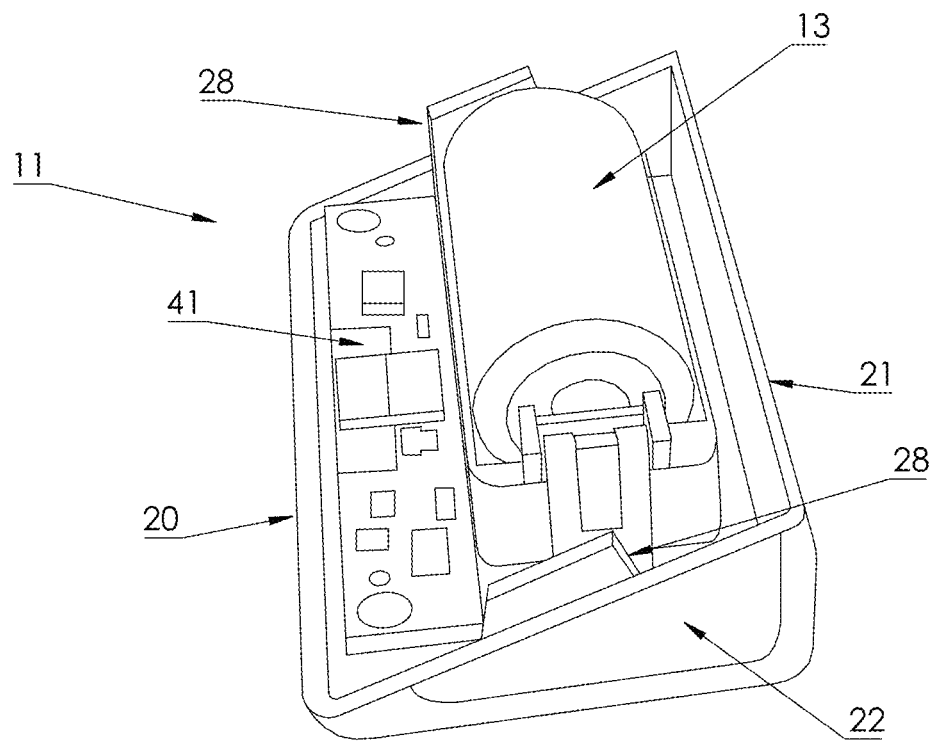
FIG. 3 is an isometric view of an information capture device for vehicle monitoring with the upper housing portion removed.

The external housing has a number of sidewalls which together define a wedge-shaped portion of the external housing. At least one opening is provided in at least one sidewall of the eternal housing. Internally, the device 10 includes an internal power supply, in the form of a battery 13 as shown in FIG. 3, at least one communication device, and at least one sensor to capture input information in relation to at least one measurable parameter relating to the vehicle (not shown).

Figure 4:
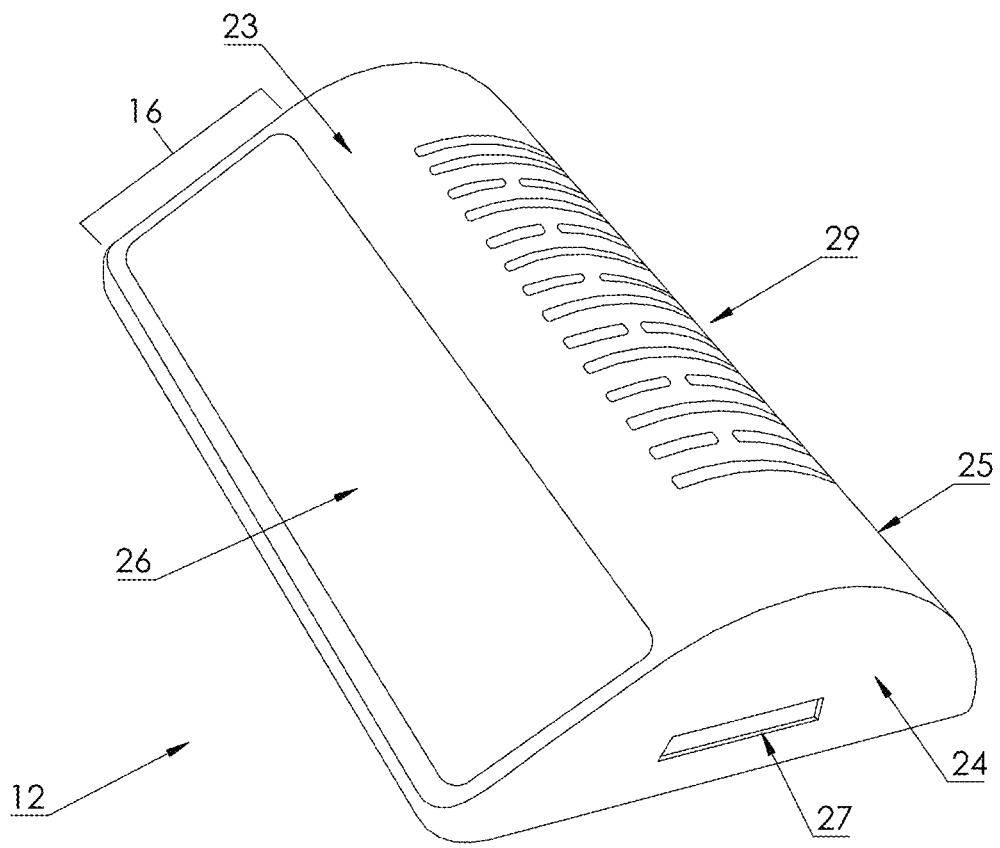
FIG. 4 is an isometric view of the upper housing portion corresponding to that removed in FIG. 3.
Figure 5:
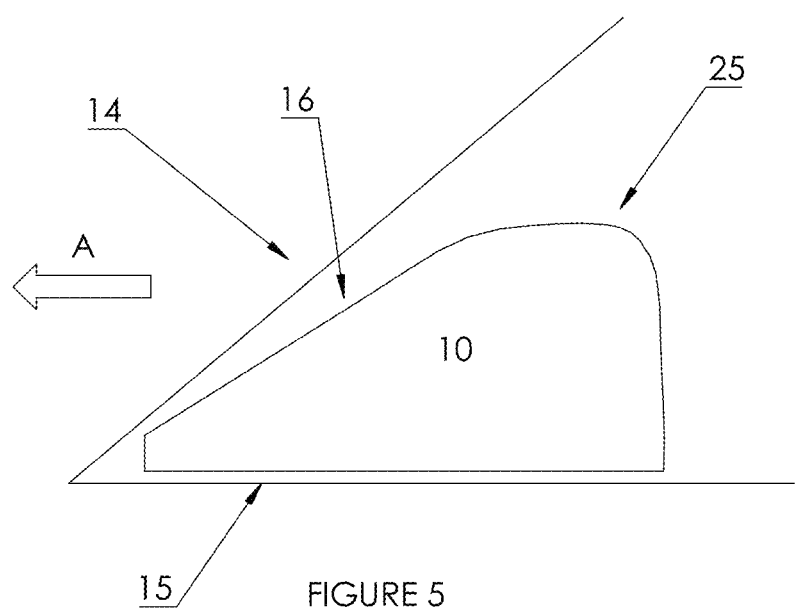
FIG. 5 is a schematic side elevation view of an information capture device for vehicle monitoring according to an embodiment in a use position relative to a vehicle dash and windscreen.

A schematic view of the preferred location and orientation of the device illustrated in FIGS. 1 to 4 is shown in FIG. 5. FIG. 5 shows the device 10 in the orientation in which it is intended to be used with respect to a forward (or rear) dash 15 and a forward (or rear) windscreen 14.

In that Figure, the device is located at the base of the forward windscreen 14 of a vehicle, mounted relative to an upper side of the dashboard 15 of the vehicle. The vehicle will normally travel in a forward direction (signified by the arrow A).

As illustrated, the housing is preferably wedge-shaped at a forward side of the device 10. As shown, the illustrated wedge-shaped housing of the device 10 includes a forward upper wall 16 which tapers downwardly at a forward end such that the thickness of the device is less at the forward end of the device and greater at the rearward end as shown. The angle of the forward upper wall 16 of the wedge-shaped housing is preferably similar to the angle of the windscreen 14 of the vehicle relative to an upper surface of the dashboard 15. Ideally, the angle of the forward upper wall 16 will correspond to the angle of the windscreen 14 but there is variation in the angle of the windscreen relative to the dashboard between OEM manufacturers and vehicle models.

The housing portions shown are manufactured from plastic materials. The material(s) used will preferably be UV resistant given that the device 10 will typically be located in an exposed position on the vehicle dashboard as shown in FIG. 5.

The housing illustrated is a multipart housing. Normally, two housing portions are provided, namely a lower housing portion 11 and an upper housing portion or cover 12, as illustrated in FIGS. 3 and 4 respectively.

The lower housing portion will normally include a base wall 17. The base wall 17 of the illustrated embodiments is planar but may be a shaped or contoured lower surface to correspond to an upper surface of the dashboard 15.

The underside of the base wall 17 of the device may be provided with a location assistance or guidance structure or configuration. A recess may be provided on the underside of the base wall 17. Preferably, double sided adhesive tape is located in the recess and used to attach the device 10 relative to the vehicle, guided by the wedge shape.

A set of apertures or openings 18 is provided through the base wall of the device. In the embodiment illustrated in FIG. 2, the apertures 18 are located in a recess 19 in the housing to space the openings from the dashboard 15. This may aid in the capture of sound and/or vibration from the dashboard 15.

These openings 18 will typically allow more directed capture of vehicle specific information (such as changes in the operation of the vehicle, for example, engine vibration and/or noise, suspension vibration etc) through the juxtaposition of the openings 18 relative to the dashboard 15.

As illustrated, a rectangular shaped housing includes at least three and preferably four sidewalls extending upwardly from the base wall. Each of the sidewalls extend from the base wall 17 substantially perpendicularly. Each sidewall extends from the base wall 17 at a peripheral location of the base wall 17.

As illustrated in FIG. 3 in particular, a forward side wall 20 is provided and is shorter or lower than a taller rear sidewall 21. The lateral sidewalls or end walls 22 have an angled upper edge extending between an upper edge of the forward side wall 20 and an upper edge of the rear side wall 21.

As shown in FIG. 4, the upper housing portion 12 includes a top wall 23. A pair of end walls 24 depend from the top wall 23. The top wall 23 has an arcuate rear portion 25 and a planar angled forward portion 16. Shaped lateral side walls or end walls 24 are provided to close the lateral sides or ends of the upper housing portion 12.

As shown in FIG. 4, a recess 26 is provided in an upper side of the angled forward portion 16. Double side adhesive tape (not shown) may be located in the recess 26 to attach the device relative to the windscreen 14.

Figure 1:
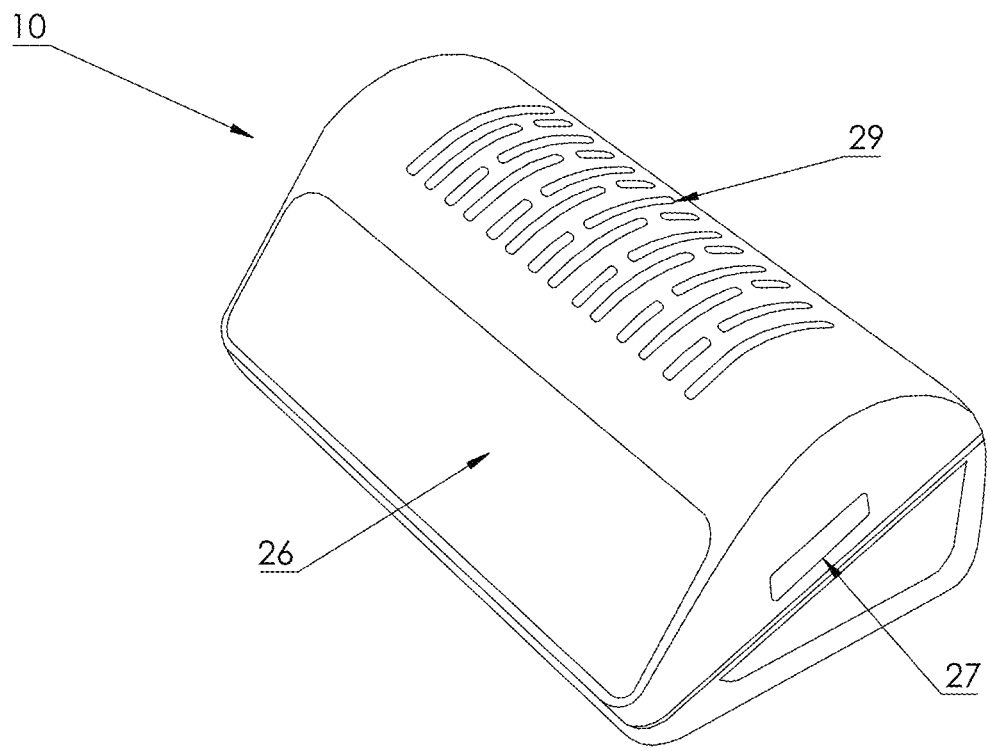
FIG. 1 is an isometric view of an information capture device for vehicle monitoring according to an embodiment.
Figure 2:
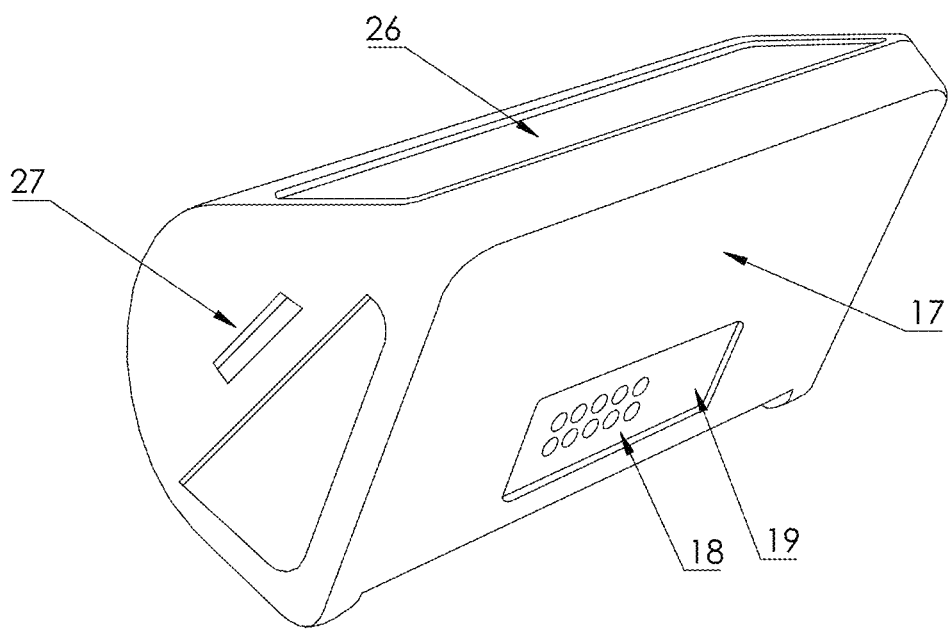
FIG. 2 is an isometric view from the underside of the device illustrated in FIG. 1.

Preferably, when the upper housing portion 12 is attached to the lower housing portion 11, a generally wedge-shaped housing is formed, such as that illustrated in FIGS. 1 and 2.

The upper housing portion 12 of the illustrated embodiments is releasably attachable relative to the lower housing portion 11. Removal of the upper housing portion 12 from the lower housing portion 11 will typically allow access to the internal components of the housing. In an embodiment, the upper housing 12 attaches to the lower housing portion 11 using a releasable attachment, with a snap fit assembly preferred.

In the illustrated embodiments, an opening is provided in each of the shaped lateral side walls or end walls 24 of the upper housing portion 12. Typically, a single elongate slot opening 27 is provided in each lateral side wall or end walls 24.

A resiliently deformable arm 28 is provided relative to each of the lateral sidewalls 22 of the lower housing portion 11. In the illustrated embodiment, each resiliently deformable arm 28 is provided with an angled surface which in use, will abut the lower edge of the shaped lateral side walls 24 of the upper housing portion 12 as the upper housing portion 12 is forced downwardly to attach the upper housing portion 12 to the lower housing portion 11. The angled surface will typically force temporary deformation of the respective resiliently deformable arm 28 inwardly.

An abutment shoulder or surface is provided on each resiliently deformable arm 28. The resiliently deformable arm 28 will preferably be deformed until the abutment shoulder or surface is aligned with an edge of the respective elongate slot opening 27 in the shaped lateral side wall 22 of the upper housing portion 12, engaging the edge to lock the upper housing portion 12 relative to the lower housing portion 11.

A user may force the deformation of the resiliently deformable arm 28 inwardly in order to clear the abutment shoulder or surface from edge of the respective elongate slot opening 27 in the shaped lateral side walls or end walls 22 of the upper housing portion 12, allowing separation of the upper housing portion 12 from the lower housing portion 11.

The upper housing portion 12 and/or lower housing portion 11 may be provided with one or more optically transparent portions. At least one optically transparent portion is preferably provided at or towards a forward side of the upper housing portion. A part of the preferred angled planar top wall is preferably optically transparent. The provision of such an optically transparent portion will typically allow the use of an optical sensor in the device 10 to capture information on at least light conditions. For example, a forwardly oriented light sensor may be provided to detect approaching headlights of oncoming traffic. An optical sensor could also be used to detect ambient light levels outside the vehicle which can be analysed for a variety of conditions/situations such as when the vehicle enters a tunnel or a carpark for example (a rapid reduction in light) as opposed to night falling (a more gradual reduction of light).

A number of openings 29 are provided in the rear portion 25 of the upper wall 23. These opening 28 will typically allow more directed capture information relating to changes or situations occurring within the vehicle (as opposed to changes in the operation of the vehicle normally captured through the openings 18 through the base wall). For example, opening 29 are more likely to allow the capture of better-quality information relating to occupant noise and may be capable of capturing directionality information as well that could allow the number of occupants to be more accurately determined, as well as seating location of occupants within the vehicle.

Any aperture or opening 18, 29 in the housing of the device 10 will typically also allow ventilation of internal components of the device 10.

The provision of the battery 13 on board the device 10 allows the device 10 to be independent of the vehicle power supply. The illustrated battery is removable and/or replaceable but any battery may be rechargeable in situ. Where the power source is provided as a battery 13 as shown, the battery 13 is typically provided at an upper part of the lower housing 11 so as to be accessible when the upper housing portion 12 is removed from the lower housing portion 11.

Figure 6:
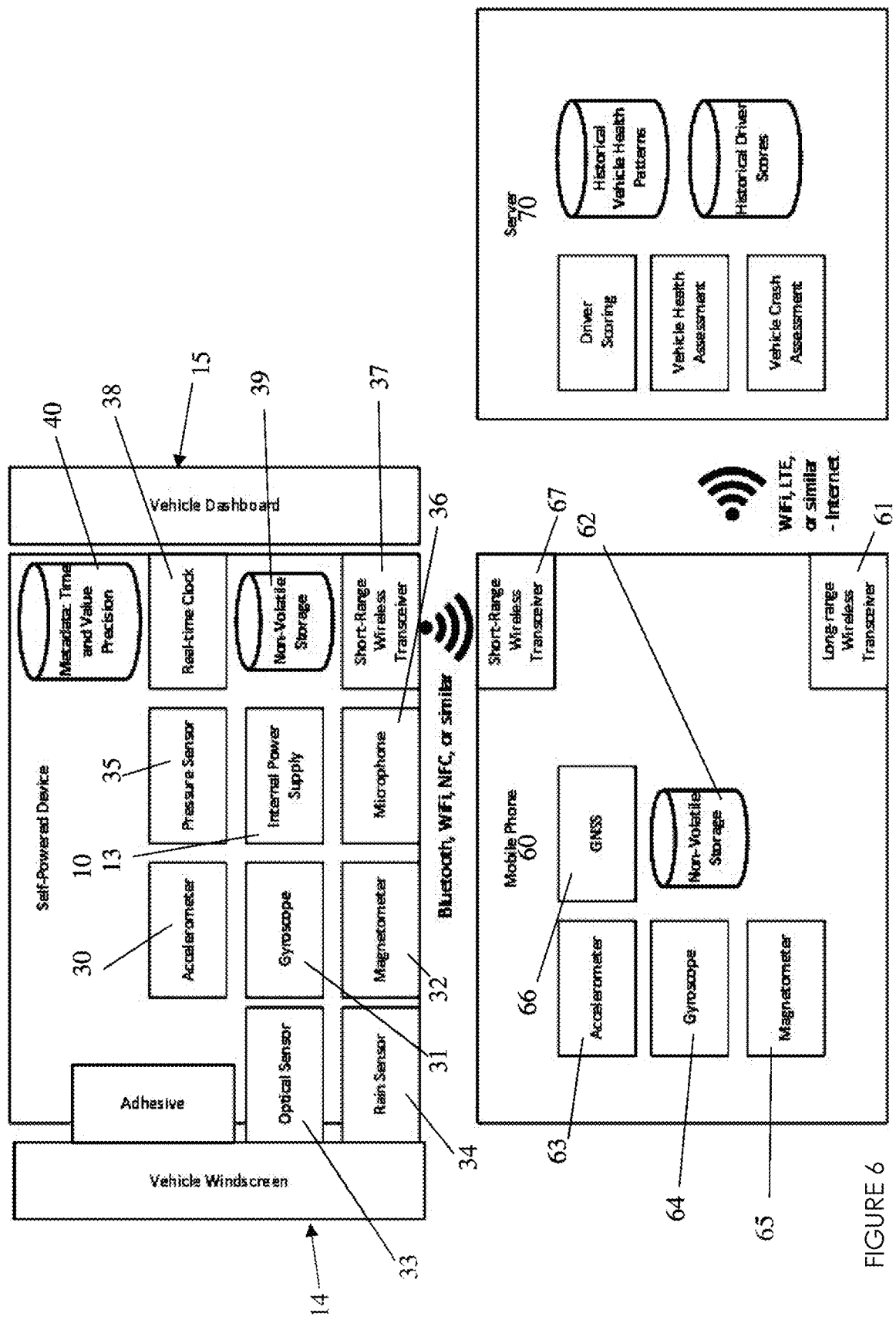
FIG. 6 is a schematic illustration of a system including an information capture device for vehicle monitoring according to an embodiment.

As will be explained further below, the device 10 may be a part of a system in which the device 10 captures information and transmits the captured information to a remote location (in the same vehicle or to outside the vehicle). Preferably, the at least one communication device is or includes a short-range wireless transceiver. A short-wave wireless transceiver can transmit to a personal computing device such as a smartphone 60 or tablet or similar as illustrated in FIG. 6. A smartphone 60 or tablet or similar may process the information thereon and/or may transmit information (raw and/or processed information) to a further remote location or server 70 for example, as illustrated in FIG. 7.

Any communication standard may be used including any one or more of Bluetooth®, WiFi®, NFC, radio, optical or similar. More than one communication device may be provided to allow different (and separate) communication pathways to be used for the same device 10. There may be advantages to providing multiple, independent communication pathways such as separation of captured information from updates or instructions relating to the operation of any one or more on board components of the device 10.

As shown in FIG. 6, the device 10 preferably includes a number of different sensors to capture input information in relation to measurable parameters relating to the vehicle. Typically, the device 10 includes a number of sensors configured to capture different types of information. The different types of information will typically be captured from the sensors contemporaneously. The advantage of capture of different types of information contemporaneously is that analysis of different types of information captured contemporaneously may reveal more than analysis of a single type of information.

As illustrated in FIG. 6, the device may include one or more accelerometer 30 preferably used to detect the orientation of the device, usually capturing information relating to the linear acceleration of movement.

As illustrated in FIG. 6, the device may include one or more gyroscope 31, to add an additional dimension to information supplied by the preferred accelerometer, by capturing information relating to angular rotational velocity.

The accelerometer 30 will typically measure the directional movement of a device but will normally not be able to resolve its lateral orientation or tilt during that movement accurately unless the gyroscope 31 is there to fill in that information.

A multi-axis accelerometer 30 may be combined with a multi-axis gyroscope 30 to provide information in relation to the orientation of the device 10 that is both clean and responsive in the same time.

As illustrated in FIG. 6, the device may include one or more magnetometer, 32 typically used to detect the Earth's magnetic field along three perpendicular axes X, Y and Z. As such, the magnetometer 32 can capture rotational information in relation to the device 10. In addition to general rotational information, the magnetometer 32 can detect the relative orientation of the device 10 relative to the Earth's magnetic north. The magnetometer 32 is preferably used to provide digital compass functionality to determined orientation of the device 10 in relation to the Earth's magnetic field.

As illustrated in FIG. 6, the device 10 may include one or more optical sensor 33 to measure quantity of light. More than one optical sensor 33 may be provided, oriented in different directions. The one or more optical sensor 33 may allow directionality of the light measurement to be determined.

As illustrated in FIG. 6, the device 10 may include one or more water sensor 34 to detect moisture, most commonly mist, fog or rain. Any type of sensor may be used for this purpose. The one or more water sensor will preferably capture information about mist, fog or rain with reference to the windscreen 14 of the vehicle in which the device 10 is located. A sensor that projects infrared light into the windscreen 14 may be used. In the embodiment illustrated in FIG. 6, the device 10 may include a rain sensor 34 such as an infrared sensor positioned relative to the housing so that the rain sensor 34 may contact the windscreen 14 when the device 10 is positioned correctly in the vehicle, as illustrated in FIG. 5.

As illustrated in FIG. 6, the device 10 may include one or more pressure sensor 35 to capture information regarding pressure inside the vehicle. The one or more pressure sensor 35 may typically capture variations/changes in pressure within the vehicle, particularly those which may indicate a particular event has taken place such as opening and closing a door of the vehicle for example. One or more pressure sensors may be provided to capture information relating to external pressure.

As illustrated in FIG. 6, the device 10 may include one or more microphones 36 to capture information relating to the level of sound within the vehicle and/or relating to the vehicle.

A microphone 36 mounted within the vehicle preferably enables the device 10 to characterize the level of potential internal acoustic distractions for the driver, including loud music or occupant noises. The one or more microphone 36 will normally be mounted within the housing. Preferably, the one or more microphones 36 will be mounted within the housing relative to one or more openings 18, 29 in a wall of the housing.

The microphone 36 preferably covers a complementary spectrum extending into higher frequencies than the accelerometer 30 to improve the detection and classification accuracy of vehicle collisions. The device/system may use frequency domain analysis and pattern recognition algorithms to identify previously trained patterns of vehicle impacts via sound captured by the microphone 36.

In the case of a vehicle collision, the device preferably stores a higher frequency set of information from all sensors before, during, and after the collision. This is typically achieved using circular buffers with configurable durations and frequencies.

The method that can be used to detect vehicle collisions can also be applied to vehicle damage detection or potential theft even if the vehicle is stationary, including glass break detection.

The microphone 36 may be used to ascertain driver/occupant entry. This in turn can be used to measure for example, the time between driver entry and vehicle ignition start or vehicle motion, as a proxy for the state of mind of the driver (on the basis that a driver than enters and then starts the vehicle may be more aware or more focussed than a driver that waits a significant period after entry to start the vehicle.

Use of door open/close detection can also be used to estimate vehicle occupancy for other reasons such as (but not limited to) risk assessment and occupancy information for High Occupancy Vehicle (HOV)/High Occupancy Toll (HOT) lane qualification.

The device may include one or more vibration sensor to capture information relating to vibrations of the device. More than one vibration sensor may be provided. A microphone 36 may be used to capture vibration information.

As illustrated in FIG. 6, the device 10 may include one or more proximity sensor to detect when an object such as a mobile telephone or tablet for example, is proximate to the device. This functionality may be used to initialise the capture of information by the device. This functionality may be used to prepare components of a mobile telephone or tablet for example. The device can utilise proximity information to use adaptive power management techniques to deliver years of operation without user intervention. The start of each trip may be automatically detected in a timely manner by detecting the vehicle door opening and closing as an initial pre-trip cue, that is, the device can exit sleep mode upon detecting the vehicle door opening and closing. This approach can ensure any mobile phone that might be present as a part of a system, can enable its GNSS subsystems and/or other sensors, so they are ready by the time the vehicle ignition is turned on, delivering more complete trip information than would be possible using information which is conventionally gathered using a mobile telephone only. This approach can provide valuable pre-trip information about the time between the driver entering the vehicle and the time the vehicle ignition is enabled, that is not available from any known aftermarket or professionally-fitted telematics hardware. A short-range transceiver 37 may be used to detect the presence of a smartphone 60 for example using one or more of Bluetooth®, WiFi®, NFC or similar protocols.

Use of information captured from more than one sensor (particularly contemporaneous information from different sensors) can lead to a reduction in false-positive situations such as using contemporaneously captured accelerometer and acoustic information to cross-check for anomalies. Another situation when information from the accelerometer and acoustic information may be used is in the classification of collisions and glass break, for example.

As illustrated in FIG. 6, the device 10 may include a real-time clock 38. The device 10 may utilise an external device such as a smartphone 60 or tablet for example to forward information captured to a remote location. The device 10 may operate in a store and forward mode until the device 10 detects the presence of an appropriate external device such as the smartphone 60. When the external device 60 is not present, the device 10 preferably continues to capture all vehicle activity in a store-and-forward manner, temporarily storing the captured information in memory on the device 10 until an appropriate external device such as the smartphone 60 is detected and can be used to forward the captured information.

As illustrated in FIG. 6, the device 10 may include one or more information storage devices onboard the device 10 to store information until the information can be forwarded. The information storage will preferably be non-volatile electronic information storage 39.

The (preferably all) information captured by the device 10 will preferably be timestamped on the device 10. One challenge with offline store-and-forward systems is the time accuracy of the internal real-time-clock 38. Rather than just capturing vehicle activity with timestamps, the device 10 will preferably calculate a measure of time accuracy of the real-time clock 38 with each trip and/or event which is stored. The measure of time precision of the real-time clock 38 is preferably encoded using metainformation 40 with the information captured. By encoding this additional information with the captured information, the information will typically become more valuable in auditing, forensic, insurance claims, or other high-integrity use cases.

The accuracy/precision of real-time clocks 38 such as the one preferably included in the device 10, is normally accounted for using periodic synchronisation with an official time reference. In this way, any difference in the time of the real-time clock 38 and the time at the official time reference, can be measured and accounted for. The accuracy/precision of the real-time clock 38 may be affected by both the recency of clock synchronization at the time of information capture, the internal clock drift characteristics, and in some cases, external factors including temperature for example. ('Accuracy' refers to how close a measurement is to the true or accepted value. 'Precision' refers to how close measurements of the same item are to each other. Precision is independent of accuracy. The real-time clock 38 used in the device 10 will typically be both accurate and precise. The real-time clock 38 is preferably configured to calculate a measure of time accuracy of the real-time clock).

The device 10 will normally have an electronic operating system operating on an onboard processor all mounted relative to a printed circuit board 41 such as that illustrated in FIG. 3. The electronic operating system will normally be or include a software application which will preferably control the operating of the components of the device 10.

As illustrated in FIG. 6, the device 10 will preferably further comprise a wireless transceiver 37. The transceiver 37 will preferably be a short-range transceiver which can be associated (wirelessly) with a long-range transceiver 61 to provide the preferred store and forward functionality.

In one implementation of the invention, the use of a commodity 3-axis MEMS based accelerometer combined with the defined shape provides the benefit of alignment between the (typical) asymmetrical characteristics of the 3 accelerometer axes in commodity sensors. In the specific case of the Analog Devices ADXL335, a 0.5-550 Hz vertical bandwidth and 0.5-1600 Hz horizontal bandwidth is available. Knowing that there is only one orientation for the installation of the device in the vehicle ensures that the accelerometer axes are aligned consistently between each vehicle and deliver consistent observations. The lower frequency range is particularly important to observe engine and road vibrations, where an engine running at 3000 RPM produces a 50 Hz signal, with road conditions typically lower frequency and vehicle vibrations higher frequency signals. The higher frequency response in the horizontal plane is valuable to measure not only crash dynamics and the signature of vehicle doors opening and closing, but also low-frequency audio spectrum (300-1600 Hz) information even without a secondary dedicated microphone sensor. Most of the spectrum supported by the combination of the 3-axis accelerometer and microphone can also be realized using a unified broad-spectrum sensor such as the ADXL1005 (0.5-23 kHz), or pairing the broad spectrum sensor with a 2-axis conventional accelerometer.

A system for high precision ambient and dynamic vehicle assessment is illustrated in FIG. 6. The system illustrated in FIG. 6 includes an in-vehicle information capture device 10, a smartphone 60 including a communication device 61 to receive captured information from the in-vehicle information capture device 10 and at least one information storage device 62, and a server 70 associated with at least one communication device 61 to receive captured information from the device 10 and a processor operating at least one software program to analyse the information captured by the in-vehicle information capture device 10.

Provision of a system including an in-vehicle information capture device 10 and a smartphone 60 will preferably allow the device 10 to operate in-vehicle when needed (such as for example when the smartphone 60 is not in range of the device 10 or has little or no outgoing service) in a store and forward mode and also in a continuous mode when possible (such as for example when the smartphone 60 is in range of the device and has sufficient outgoing service). The device 10 may provide captured information to a remote location through the smartphone 60, preferably using the communication components of the smartphone 60, which allows the device 10 to be simplified as much as possible as it does not require complex and/or powerful onboard communications components.

The smartphone 60 used as an example within the system will typically be provided with sufficiently powerful communications components to undertake long range (or longer range than the device 10) communications. The smartphone 60 will normally include a short-range wireless transceiver 67 (this may be the same transceiver as the long-range transceiver 61 or a separate unit).

As is normal with smartphones 60, the smartphone 60 may include at least one on-board accelerometer 63, at least one on-board gyroscope 64, at least one on-board magnetometer 65 and at least one on-board navigation component/system 66. Normally, a smartphone 60 for example, will include a Global Navigation Satellite System (GNSS) component 66.

As illustrated in FIG. 6, the smartphone 60 may include at least one on-board non-volatile, electronic information storage component 62.

The long-range wireless transceiver may be configured to send and receive information to and from an associated remote location.

The smartphone 60 will normally have an electronic operating system operating on an onboard processor. The electronic operating system will normally be or include a software application which will preferably control the operating of the components of the smartphone 60. A secondary software application may be provided for operation on the smartphone 60 to interface with the device 10. Preferably the secondary software application interfaces with a software application operating on the device 10. The secondary software application may interface with a server software application operating on a remote server 70.

The server 70 may receive the captured information directly from the in-vehicle information capture device 10 but the embodiment illustrated in FIG. 6 has the server 70 receiving the captured information via the smartphone 60.

Typically, only minimal processing will take place on the in-vehicle information capture device 10. Preferably, only information processing that is required to ensure the encoding of the timestamp information with the captured information (and to maintain information integrity) will occur on the in-vehicle information capture device 10.

Preferably, the bulk of the processing of the captured information will occur at the server 70. Analysis of any captured information will preferably occur at the server 70. Long term storage of captured information (and/or any analysis thereof) will preferably occur in storage associated with the server 70.

As illustrated in FIG. 6, the server 70 can analyse the captured information to determine information relating to driver performance, vehicle health, vehicle events such as crashes, and store this information to track historical vehicle health patterns and historical driver performance.

The device 10 of the preferred embodiment includes high-precision sensors to measure vehicle dynamics, along with non-volatile storage to ensure vehicle activities are measured with or without a smartphone being present. A short-range wireless mechanism is used to communicate with a smartphone for both transferring vehicle dynamics information, and for secure software and configuration updates. Sensors typically include accelerometers along with gyroscopes, optical, acoustic, magnetometer/digital compass, barometer, and rain sensor options. An internal real-time-clock is also used to associate vehicle activities and events with specific times.

The device 10 preferably uses adaptive power management techniques to deliver years of operation without user intervention. The start of each trip is automatically detected in a timely manner by detecting the vehicle door opening and closing as an initial pre-trip cue. This approach ensures any smartphone that might be present can enable its GNSS subsystems and other sensors so they are ready by the time the vehicle ignition is turned on, delivering more complete trip information than would be possible using mobile-only information. In fact, this approach provides valuable pre-trip information about the time between the driver entering the vehicle and the time the vehicle ignition is enabled, information that is not available from aftermarket or professionally-fitted telematics hardware. Measuring the time between driver entry and vehicle start is useful to improve the accuracy of driver identification, in addition to providing insight into the state of mind of the driver before their trip: For example, a driver in a hurry may close the door more abruptly and start the car quicker than the same individual in a calmer state of mind.

The same door opening and closing classifier can be used to help differentiate between a single-occupancy vehicle and multiple-occupancy vehicle. A single-occupancy vehicle typically produces a single door open/close sequence, helping to provide context about each trip without the need to install additional internal occupancy sensors. This information is valuable to assess driving risks based on potential internal occupant interactions, in addition to providing input for automated or semi-automated high-occupancy/tolled lanes involving single or multi-occupant rules.

The device 10 and a system including such a device presents a unique solution to the unsolved problem of traditional beacons or tags being placed or installed incorrectly within a vehicle. In this embodiment of the device part of the system, additional ambient information can be reliably measured including the presence and intensity of precipitation on the windscreen using an infrared rain sensor on the surface in contact with the windscreen. The preferred asymmetrical shape of the device 10 provides intuitive guidance for the driver to install with the flatter side down and a portion of the upper surface in contact with the windscreen 14. A small adhesive area is preferably included in the device 10 to further improve the reliability of the mechanical coupling between the vehicle and device 10.

Additional capabilities made possible as a result of the unique device shape and self-installation location includes use of low-cost optical sensors as additional cues to classify covered or uncovered vehicle parking locations, ambient lighting conditions throughout each journey, and also use the same sensors to detect the presence of headlights from oncoming traffic. All of these observations of contextual and ambient conditions are useful sources of information to help assess dynamic driver and vehicle risk.

Using the placement of the device 10 between the windscreen and dashboard guided by the shape of the housing enables road network information to be measured using the unique frequency spectrum characteristics produced from a vehicle driving on an asphalt paved surface, an unfinished (gravel) surface, or a concrete surface for example. Similarly, the vehicle movements in response to driving over potholes and raised speed bumps can also be more reliably differentiated due to the mechanical coupling of the device and the vehicle.

A hybrid decision making framework can be employed to classify both road conditions and anomalies. This hybrid approach is important to enable high accuracy classification with limited local resources. A set of predefined low-level patterns may be recognized within the device and delivered to the server along with additional relevant parameters (vehicle speed, vehicle type, location, and power spectral density). On the server, time sequences of pre-identified low-level patterns and parameters can then be evaluated at a higher level using both historical patterns within the known vehicle, and patterns observed by other vehicles on the same road segments. While information from other vehicles is not required, when it is available, it can help to further improve the accuracy of persistent road surface anomalies such as minor potholes. This decision-making framework can be valuable to ensure driving behaviours are quantified in the context of the underlying road surface conditions, minimizing false-positives for harsh braking events and decoupling vehicle behaviours resulting from driver actions (or inaction) from vehicle behaviours resulting from road surface anomalies.

For example, in the case of a vehicle crossing a rumble strip, the characteristic "rumble" easily identifiable to the driver is also observed by the accelerometer within the device as a low-level pattern input into the hybrid decision making framework. Transverse rumble strips are identifiable by similar patterns being generated from multiple vehicles traveling along the same road segment (correlated by location), whereas shoulder and centreline rumble strips are normally identifiable only by vehicles making specific lateral manoeuvres (lane change) when the rumble strip pattern was detected.

The one or more embodiments are described above by way of example only. Many variations are possible without departing from the scope of protection afforded by the appended claims.

What is claimed is:

1. A windscreen-mounted information capture device for vehicle monitoring of a vehicle, the device comprising:
   a. an external housing with at least one wall that tapers toward a base wall at a forward end and a thickness of the device is less at the forward end of the device and greater at a rearward end so that the external housing is positively locatable into a gap between a windscreen of the vehicle and a dash of the vehicle;
   b. at least one power supply;
   c. at least one communication transceiver; and
   d. at least one sensor to capture input information in relation to at least one measurable parameter relating to the vehicle.

2. The information capture device as claimed in claim 1 wherein at least one sensor is provided to capture input information in relation to at least one measurable parameter relating to vehicle dynamics.

3. The information capture device as claimed in claim 1 wherein at least one sensor is provided to capture input information in relation to at least one measurable parameter relating to conditions within the vehicle or outside the vehicle.

4. The information capture device as claimed in claim 1 wherein at least one sensor is provided to capture input information in relation to at least one measurable parameter relating to events occurring within the vehicle or outside the vehicle.

5. The information capture device as claimed in claim 1 wherein at least one sensor is provided to capture input information in relation to at least one measurable parameter relating to occupant entry to and/or exit from the vehicle.

6. The information capture device as claimed in claim 1 wherein the external housing is configured so that the external housing is wedgeable into the gap.

7. The information capture device as claimed in claim 1 wherein the external housing has a wedge configuration.

8. The information capture device as claimed in claim 1 wherein the external housing comprises at least one movable portion, movable between any two or more positions so that the external housing can be wedged into the gap between two surfaces.

9. The information capture device as claimed in claim 1 wherein the housing is provided with one or more optically transparent portions.

10. The information capture device as claimed in claim 1 wherein a plurality of sensors is provided within the housing to capture input information in relation to at least one measurable parameter relating to the vehicle.

11. The information capture device as claimed in claim 10 configured to capture input information from each of the plurality of sensors contemporaneously.

12. The information capture device as claimed in claim 1 wherein the at least one sensor comprises any one or more of one or more accelerometer, one or more gyroscope, one or more magnetometer, one or more optical sensor to measure quantity of light, one or more water sensor to detect moisture, one or more pressure sensor, one or more sound sensor/microphone to capture information relating to the level of sound within the vehicle and/or relating to the vehicle.

13. The information capture device as claimed in claim 12 wherein the detection of an event occurrence by at least one sensor initialises capture of input information by the at least one other sensor.

14. The information capture device as claimed in claim 12 wherein input information captured contemporaneously from more than one sensor is analysed to cross-check for anomalies.

15. The information capture device as claimed in claim 12 wherein at least one microphone is provided within the device.

16. The information capture device as claimed in claim 1 wherein the at least one sensor comprises one or more vibration sensor to capture information relating to vibrations of the device.

17. The information capture device as claimed in claim 1 further comprising one or more proximity sensor to detect when a portable computing device is proximate to the device.

18. The information capture device as claimed in claim 1 further comprising one or more real-time clock to timestamp captured input information on the device.

19. The information capture device as claimed in claim 1 further comprising a real-time clock accuracy calculator to calculate a measure of time accuracy of the real-time clock for each trip and/or event in relation to which captured input information is stored and encode the measure of time accuracy with the captured input information for each trip and/or event.

20. A system for high precision ambient and dynamic vehicle assessment, the system comprising the information capture device according to claim 1 and a portable computing device including at least one communication device to receive captured information from the information capture device and at least one information storage device.

21. The system for high precision ambient and dynamic vehicle assessment as claimed in claim 20 wherein the information capture device operates in a continuous mode when the portable computing device is within range of the in-vehicle information capture device and in a store and forward mode and when the portable computing device is not within range of the information capture device.

22. The system for high precision ambient and dynamic vehicle assessment as claimed in claim 20 wherein the information capture device comprises a short-range wireless transceiver to send information to the portable computing device and the portable computing device includes a long-range wireless transceiver to forward the information.

23. A system for high precision ambient and dynamic vehicle assessment comprising the information capture device according to claim 1 and a server associated with at least one communication device to receive captured information from the device and a processor operating at least one software program to analyse the information captured by the information capture device.

24. The system for high precision ambient and dynamic vehicle assessment as claimed in claim 20 further comprising a server associated with at least one communication device to receive captured information from the device and a processor operating at least one software program to analyse the information captured by the information capture device.

25. The system for high precision ambient and dynamic vehicle assessment as claimed in claim 20 wherein frequency domain analysis and pattern recognition algorithms are utilised to identify previously trained patterns of vehicle events based on information captured by the information capture device.

\* \* \* \* \*